(12) United States Patent
Spomer et al.

(10) Patent No.: US 10,645,922 B2
(45) Date of Patent: May 12, 2020

(54) METHODS AND COMPOSITIONS FOR PEST BAIT

(71) Applicant: Dow AgroSciences LLC, Indianapolis, IN (US)

(72) Inventors: Neil A Spomer, Indianapolis, IN (US); Christian Guy Becker, King of Prussia, PA (US); Eva Chin-Heady, Indianapolis, IN (US); Joseph J. Demark, Fayetteville, AR (US); Phillip J Howard, Indianapolis, IN (US); Juan Llauro, Buenos Aires (AR); Meredith Paige Oliver, Indianapolis, IN (US)

(73) Assignee: DOW AGROSCIENCES LLC, Indianapolis, IN (US)

( * ) Notice: Subject to any disclaimer, the term of this patent is extended or adjusted under 35 U.S.C. 154(b) by 0 days.

(21) Appl. No.: 15/766,292

(22) PCT Filed: Oct. 3, 2016

(86) PCT No.: PCT/US2016/055132
§ 371 (c)(1),
(2) Date: Apr. 5, 2018

(87) PCT Pub. No.: WO2017/062305
PCT Pub. Date: Apr. 13, 2017

(65) Prior Publication Data
US 2018/0288999 A1    Oct. 11, 2018

Related U.S. Application Data

(60) Provisional application No. 62/237,196, filed on Oct. 5, 2015.

(51) Int. Cl.
*A01N 25/00* (2006.01)
*A01N 25/10* (2006.01)
*A01N 27/00* (2006.01)

(52) U.S. Cl.
CPC .......... *A01N 25/006* (2013.01); *A01N 25/10* (2013.01); *A01N 27/00* (2013.01); *A01N 2300/00* (2013.01)

(58) Field of Classification Search
None
See application file for complete search history.

(56) References Cited

U.S. PATENT DOCUMENTS

| 4,506,473 | A | 3/1985 | Waters et al. |
|---|---|---|---|
| 4,892,866 | A | 1/1990 | Itzel et al. |
| 6,017,849 | A | 1/2000 | Daly et al. |
| 2008/0081030 | A1* | 4/2008 | DeMark ............... A01M 1/2011 424/84 |
| 2010/0292253 | A1* | 11/2010 | Trullinger ............ C07D 417/04 514/256 |
| 2013/0345060 | A1* | 12/2013 | Becker .................. A01N 27/00 504/357 |
| 2014/0111735 | A1 | 4/2014 | Cho et al. |

FOREIGN PATENT DOCUMENTS

| WO | WO-2008071714 A1 * | 6/2008 | ............. A01N 27/00 |
|---|---|---|---|
| WO | 2017062305 | 4/2017 | |

OTHER PUBLICATIONS

Larson, Larry L. "Novel organic and natural product insect management tools." Radcliffe's IPM World Textbook, url: http://ipmworld.umm. edu/chapters/larson. htm, University of Minnesota, St. Paul, MN (1998). Downloaded Feb. 18, 2019. (Year: 1998).*
Manganaris et al., Novel 1-methylcyclopropene immersion formulation extends shelf life of advanced maturity 'Joanna Red' plums (*Prunus salicina* Lindell) in Postharvest Biology and Technology, 2008, vol. 47, pp. 429-433.
International Search Report; PCT/US16/055132 dated Dec. 23, 2016; 1 pg.

* cited by examiner

*Primary Examiner* — Michael P Cohen
(74) *Attorney, Agent, or Firm* — Magleby Cataxinos & Greenwood

(57) ABSTRACT

This invention is based on the discovery that 1-methylcyclopropene (1-MCP) can cause feeding stimulation by *Reticulitermes flavipes* workers. Provided are pest baits comprising one or more compounds of Compound A and one or more pesticide for pest management. In one embodiment, the pest baits are useful against termites. Also provided are methods for attracting and/or controlling pests, using the pest baits provided herein.

11 Claims, 1 Drawing Sheet

METHODS AND COMPOSITIONS FOR PEST BAIT

CROSS REFERENCE TO RELATED APPLICATION

This application is a national phase entry under 35 U.S.C. § 371 of international Patent Application No. PCT/US2016/055132, filed Oct. 3, 2016, which claims the benefit of U.S. Provisional Patent Application Ser. No. 62/237,196 filed Oct. 5, 2015.

BACKGROUND OF THE INVENTION

This invention is related to the field of pest baits and related processes.

Termites are pests because they eat cellulose. Termites attack buildings, furniture, fences, utility poles, and other wooden objects. Termites also destroy products other than wood such as paper, books, clothing, shoes, and leather items. Termites also injure living trees and shrubs. Termites are known to chew through concrete and plastics. It has been estimated that control and repair costs due to just subterranean termites cost billions of dollars each year. This impacts the average homeowner in the United States of America because typical home insurance excludes termite damage. Besides the monetary impact, termites inflict immeasurable amounts of distress to homeowners. For example, having termites emerging inside one's home is distressing and the thought of termites eating one's home (usually the homeowner's largest investment) is frightening. Furthermore, in a survey of homeowners, more than ninety percent expressed concern over the prospect of finding termites in their home. A similar high percentage believed termites ate wood quickly and cause extensive damage in a short period of time. Half of all respondents estimated that an infestation of termites could cause serious structural damage to a home in six months or less. Because of all of the reasons above, research is constantly being conducted to control or eradicate termites. However, while some success has been made, further inventions are needed in order to more fully combat this growing problem.

SUMMARY OF THE INVENTION

This invention is based on the discovery that 1-methylcyclopropene (1-MCP) can cause feeding stimulation by *Reticulitermes flavipes* workers. Provided are pest baits comprising one or more compounds of Compound A and one or more pesticide for pest management. In one embodiment, the pest baits are useful against termites. Also provided are methods for attracting and/or controlling pests, using the pest baits provided herein.

In one aspect, provided is a pest bait comprising an effective amount of Compound A as an attractant comprising at least one cyclopropene compound.

In one embodiment, the cyclopropene compound is of the formula:

wherein R is a substituted or unsubstituted alkyl, alkenyl, alkynyl, cycloalkyl, cycloalkylalkyl, phenyl, or naphthyl group; wherein the substituents are independently halogen, alkoxy, or substituted or unsubstituted phenoxy. In a further embodiment, R is $C_1$-$C_8$ alkyl. In another embodiment, R is methyl.

In another embodiment, the cyclopropene compound is of the formula:

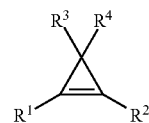

wherein $R^1$ is a substituted or unsubstituted $C_1$-$C_4$ alkyl, $C_1$-$C_4$ alkenyl, $C_1$-$C_4$ alkynyl, $C_3$-$C_6$ cycloalkyl, cylcoalkylalkyl, phenyl, or napthyl group; and $R^2$, $R^3$, and $R^4$ are hydrogen.

In another embodiment, the Compound A comprises 1-methylcyclopropene (1-MCP). In another embodiment, the cyclopropene compound is encapsulated with a molecular encapsulating agent. In a further embodiment, the molecular encapsulating agent is selected from alpha-cyclodextrin, beta-cyclodextrin, gamma-cyclodextrin, or combinations thereof.

In one embodiment, the attractant attracts termites, ants, cockroaches, or combinations thereof. In a further embodiment, the termites are selected from the group consisting of *Reticulitermes tibialis, Reticulitermes flavipes, Reticulitermes virginicus*, and combinations thereof. In another embodiment, the pest bait provided further comprises an insecticide. In a further embodiment, the insecticide is selected from the group consisting of abamectin, acephate, acetamiprid, acetoprole, aldicarb, amidoflumet, amitraz, avermectin, azadirachtin azinphos-methyl, bifenthrin, bifenazate, bistrifluoron, buprofezin, carbofuran, cartap, chinomethionat, chlorfenapyr, chlorfluazuron, chlorantraniliprole, chlorpyrifos, chlorpyrifos-methyl, chlorobenzilate, chromafenozide, clothianidin, cyflumetofen, cyfluthrin, beta-cyfluthrin, cyhalothrin, gamma-cyhalothrin, lambda-cyhalothrin, cyhexatin, cypermethrin, cyromazine, deltamethrin, diafenthiuron, diazinon, dicofol, dieldrin, dienochlor, diflubenzuron, dimefluthrin, dimethoate, dinotefuran, diofenolan, emamectin, endosulfan, esfenvalerate, ethiprole, etoxazole, fenamiphos, fenazaquin, fenbutatin oxide, fenothiocarb, fenoxycarb; fenpropathrin, fenpyroximate, fenvalerate, fipronil, flonicamid, flubendiamide, flucythrinate, tau-fluvalinate, flufenerim, flufenoxuron, fonophos, halofenozide, hexaflumuron, hexythiazox, hydramethylnon, imicyafos, imidacloprid, indoxacarb, isofenphos, lufenuron, malathion, metaflumizone, metaldehyde, methamidophos, methidathion, methomyl, methoprene, methoxychlor, methoxyfenozide, metofluthrin, monocrotophos, nitenpyram, nithiazine, novaluron, noviflumuron, oxamyl, parathion, parathion-methyl, permethrin, phorate, phosalone, phosmet, phosphamidon, pirimicarb, profenofos, profluthrin, propargite, protrifeBbute, pymetrozine, pyrafluprole, pyrethrin, pyridaben, pyridalyl, pyrifluquinazon, pyriprole, pyriproxyfen, rotenone, ryanodine, spinetoram, spinosad, spiridiclofen, spiromesifen, spirotetramat, sulprofos, tebufenozide, tebufenpyrad, teflubenzuron, tefluthrin, terbufos, tetrachlorvinphos, thiacloprid, thiamethoxam, thiodicarb, thiosultap-sodium, tolfenpyrad, tralomethrin, triazamate, trichlorfon, triflumuron, an encapsulated delta-endotoxin of *Bacillus thuringiensis*, and combinations thereof. In another embodiment, the pest bait provided further comprises a pest food.

In another aspect, provided is a method for attracting pests. The method comprises exposing a pest with an effective amount of Compound A as an attractant comprising at least one cyclopropene compound.

In one embodiment, the cyclopropene compound is of the formula:

wherein R is a substituted or unsubstituted alkyl, alkenyl, alkynyl, cycloalkyl, cycloalkylalkyl, phenyl, or naphthyl group; wherein the substituents are independently halogen, alkoxy, or substituted or unsubstituted phenoxy. In a further embodiment, R is $C_1$-$C_8$ alkyl. In another embodiment, R is methyl.

In another embodiment, the cyclopropene compound is of the formula:

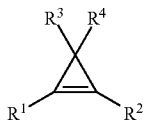

wherein $R^1$ is a substituted or unsubstituted $C_1$-$C_4$ alkyl, $C_1$-$C_4$ alkenyl, $C_1$-$C_4$ alkynyl, $C_3$-$C_6$ cycloalkyl, cylcoalkylalkyl, phenyl, or napthyl group; and $R^2$, $R^3$, and $R^4$ are hydrogen.

In another embodiment, the Compound A comprises 1-methylcyclopropene (1-MCP). In another embodiment, the cyclopropene compound is encapsulated with a molecular encapsulating agent. In a further embodiment, the molecular encapsulating agent is selected from alpha-cyclodextrin, beta-cyclodextrin, gamma-cyclodextrin, or combinations thereof.

In one embodiment, the attractant attracts termites, ants, cockroaches, or combinations thereof. In a further embodiment, the termites are selected from the group consisting of *Reticulitermes tibialis, Reticulitermes flavipes, Reticulitermes virginicus*, and combinations thereof.

In another aspect, provided is a method for controlling pests. The method comprises (i) exposing a pest with an effective amount of Compound A as an attractant comprising at least one cyclopropene compound; and (ii) exposing the pest with an effective amount of insecticide.

In one embodiment, the cyclopropene compound is of the formula:

wherein R is a substituted or unsubstituted alkyl, alkenyl, alkynyl, cycloalkyl, cycloalkylalkyl, phenyl, or naphthyl group; wherein the substituents are independently halogen, alkoxy, or substituted or unsubstituted phenoxy. In a further embodiment, R is $C_1$-$C_8$ alkyl. In another embodiment, R is methyl.

In another embodiment, the cyclopropene compound is of the formula:

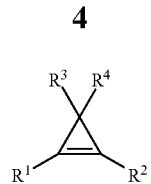

wherein $R^1$ is a substituted or unsubstituted $C_1$-$C_4$ alkyl, $C_1$-$C_4$ alkenyl, $C_1$-$C_4$ alkynyl, $C_3$-$C_6$ cycloalkyl, cylcoalkylalkyl, phenyl, or napthyl group; and $R^2$, $R^3$, and $R^4$ are hydrogen.

In another embodiment, the Compound A comprises 1-methylcyclopropene (1-MCP). In another embodiment, the cyclopropene compound is encapsulated with a molecular encapsulating agent. In a further embodiment, the molecular encapsulating agent is selected from alpha-cyclodextrin, beta-cyclodextrin, gamma-cyclodextrin, or combinations thereof.

In one embodiment, the attractant attracts termites, ants, cockroaches, or combinations thereof. In a further embodiment, the termites are selected from the group consisting of *Reticulitermes tibialis, Reticulitermes flavipes, Reticulitermes virginicus*, and combinations thereof.

In another embodiment, the insecticide is selected from the group consisting of abamectin, acephate, acetamiprid, acetoprole, aldicarb, amidoflumet, amitraz, avermectin, azadirachtin azinphos-methyl, bifenthrin, bifenazate, bistrifluoron, buprofezin, carbofuran, cartap, chinomethionat, chlorfenapyr, chlorfluazuron, chlorantraniliprole, chlorpyrifos, chlorpyrifos-methyl, chlorobenzilate, chromafenozide, clothianidin, cyflumetofen, cyfluthrin, beta-cyfluthrin, cyhalothrin, gamma-cyhalothrin, lambda-cyhalothrin, cyhexatin, cypermethrin, cyromazine, deltamethrin, diafenthiuron, diazinon, dicofol, dieldrin, dienochlor, diflubenzuron, dimefluthrin, dimethoate, dinotefuran, diofenolan, emamectin, endosulfan, esfenvalerate, ethiprole, etoxazole, fenamiphos, fenazaquin, fenbutatin oxide, fenothiocarb, fenoxycarb; fenpropathrin, fenpyroximate, fenvalerate, fipronil, flonicamid, flubendiamide, flucythrinate, tau-fluvalinate, flufenerim, flufenoxuron, fonophos, halofenozide, hexaflumuron, hexythiazox, hydramethylnon, imicyafos, imidacloprid, indoxacarb, isofenphos, lufenuron, malathion, metaflumizone, metaldehyde, methamidophos, methidathion, methomyl, methoprene, methoxychlor, methoxyfenozide, metofluthrin, monocrotophos, nitenpyram, nithiazine, novaluron, noviflumuron, oxamyl, parathion, parathion-methyl, permethrin, phorate, phosalone, phosmet, phosphamidon, pirimicarb, profenofos, profluthrin, propargite, protrifeBbute, pymetrozine, pyrafluprole, pyrethrin, pyridaben, pyridalyl, pyrifluquinazon, pyriprole, pyriproxyfen, rotenone, ryanodine, spinetoram, spinosad, spiridiclofen, spiromesifen, spirotetramat, sulprofos, tebufenozide, tebufenpyrad, teflubenzuron, tefluthrin, terbufos, tetrachlorvinphos, thiacloprid, thiamethoxam, thiodicarb, thiosultap-sodium, tolfenpyrad, tralomethrin, triazamate, trichlorfon, triflumuron, an encapsulated delta-endotoxin of *Bacillus thuringiensis*, and combinations thereof.

In another aspect, provided is a method for attracting pests and/or controlling pests. The method comprises exposing a pest with the pest bait as described herein.

DETAILED DESCRIPTION OF THE INVENTION

Figure 1A:
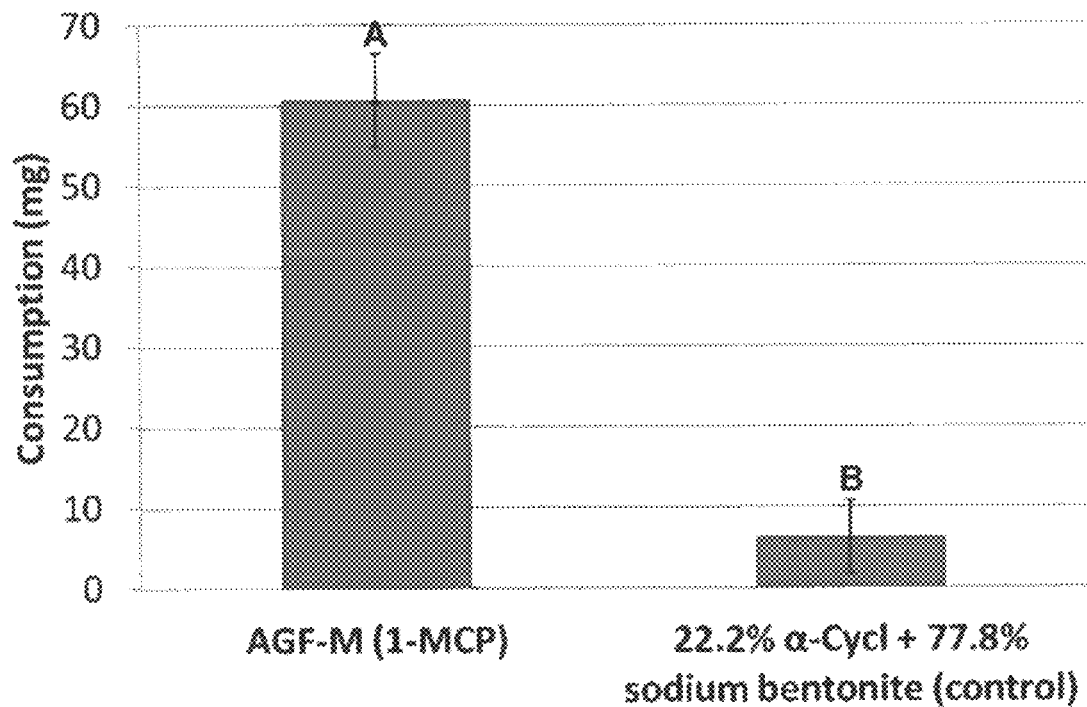
FIG. 1A shows results of a representative experiment for 1-MCP as an attractant to termite, where filter paper consumption is significantly increase with presence of 1-MCP.

The examples given in the definitions are generally non-exhaustive and must not be construed as limiting the invention disclosed in this document. It is understood that a substituent should comply with chemical bonding rules and steric compatibility constraints in relation to the particular molecule to which it is attached.

Termites can be controlled by the pest baits disclosed herein, especially such termites as *Reticulitermes* spp., *Heterotermes* spp., and *Coptotermes* spp. Suitable examples of termites that can be controlled are: *Reticulitermes flavipes; Reticulitermes virginicus; Reticulitermes Hesperus; Heterotermes aureus; Coptotermes formosanus; Reticulitermes speratus; Reticulitermes grassei; Reticulitermes santonensis; Macrotermes gilvus;* and *Reticulitermes hageni*.

Cellulose is a long-chain polymeric polysaccharide carbohydrate of glucose. It forms the primary structural component of wood. Wood contains about fifty weight percent cellulose and cotton contains about ninety weight percent cellulose. Cellulose is also sometimes used as a generic term for a composition that contains alpha cellulose, beta cellulose, and gamma cellulose. Alpha cellulose has a much higher degree of polymerization ("DP") than beta or gamma cellulose. Alpha cellulose has a DP in the thousands depending on the source of the alpha cellulose. Alpha cellulose is readily available and can be purchased from a variety of sources. Alpha cellulose can be made into microcrystalline cellulose. Microcrystalline cellulose has a DP of less than about 400.

The components of the pest bait can be mixed together in any manner known in the art. In general the amount of components to use is not critical and can vary by a wide amount depending on the other factors (such as insecticide(s), binder(s), attractant(s), etc.) added to mixture to form into the pest bait.

In general the amount of insecticide to use is also not critical. Amounts from 0.0001 to 20 weight percent based on the weight of the pest bait can be used.

After mixing, the pest bait can be compacted. This compacted pest bait can take any useful form, such as, tablets, briquettes, pellets, granules, etc. These types of forms can be made by any process known in the art. In another embodiment the compacted pest bait has a density greater than 1 gram per cubic centimeter. Densities less than 1 gram per cubic centimeter can be used but are not preferable in most cases. Once the compacted pest bait has been made, it can be dried. This drying can occur in any manner known in the art that will remove a portion of the water used in making the compacted composition. The dried compacted pest bait should be substantially-free of water so as to inhibit microbial growth when compared to the surrounding environment. In another embodiment of the invention the dried compacted pest bait should have less than about twenty weight percent water based on the total weight of the dried compacted pest bait. In another embodiment of the invention the dried compacted pest bait should have less than about fifteen weight percent water based on the total weight of the dried compacted pest bait. In another embodiment of the invention the dried compacted pest bait should have less than about ten weight percent water based on the total weight of the dried compacted pest bait.

The compacted pest bait can be used to control termites. For example, the compacted pest bait can be placed in the ground, perhaps inside another tube that allows access for termites. The compacted pest bait can also be encased in a durable material, such as disclosed in U.S. Pat. No. 6,857,223 B2 (hereby incorporated by reference). In this patent, a pest bait is hermetically sealed with a non-biodegradable material through which termites can tunnel or chew.

Optional ingredients to include in the pest bait include, but are not limited to, a preservative to retard fungal growth and a protectant such as a bittering agent to provide a safety factor for exposed bait. An attractant is defined as any substance or combination of substances which will lure pests. Examples of attractants are carbon dioxide and terpenes. Feeding stimulants that can be used in the pest baits are, for example, polyhydroxy alcohols such as glycerin, and starch. Examples of preservatives useful in the present invention are 1,2-benzisothiazolin-3-one (PROXEL GXL® Arch Chemicals, Inc. Norwalk, Conn. 06856) methyl paraben (p-hydroxybenzoic acid methyl ester) and propyl paraben (n-propyl p-hydroxybenzoate). Fungistats would also be effective in increasing the longevity of the pest bait and retarding mold growth.

The pest bait can be place in an area where at least one termite would be able to come across the pest bait. For example, the pest bait can be placed into the ground. As another embodiment, the pest bait can be placed in a termite station that is in the ground. Such stations and methods are known in the art, for example, in U.S. Pat. Nos. 6,016,625; 6,370,812 and 6,857,223. In another embodiment, the pest bait can be used above ground. Such methods are known in the art, for example, U.S. Pat. No. 5,406,744. Once a termite comes into contact with the bait, the termite will eat the bait, or destroy the durable material encasing the bait thereby getting at the bait. Once a portion of the bait is eaten, the termite would recruit other termites from the same colony to come and eat the bait, thereby further contaminating the colony with an insecticide, if the pest bait has insecticide in the bait.

In one embodiment, the bait material is a cellulosic food material that is selected based upon known or measured attractability for a given pest that is being targeted. In one aspect for example, when the composite member is to be used to target a certain pest species, the composite member can be made using a cellulosic food material that is a favorite food of the target pest species. The cellulosic food material would therefore be palatable to members of the target pest species, such as termites, and would be expected to be consumed or displaced by the pests, which would result in the simultaneous consumption or displacement of the pesticide present in the composite member, producing a desired pesticidal effect. In one embodiment, the food material is a purified cellulose, such as, for example, alpha cellulose, including compressed alpha cellulose. One non-limiting example of compressed alpha cellulose includes preferred texture cellulose (PTC). In another embodiment, the food material is wood or a derivative of wood. Non-limiting examples of wood and wood derivatives include wood chips, wood fibers, sawdust, cardboard, paper or other material that is palatable to a targeted wood-destroying species. Other cellulosic food materials that can be employed include microcrystalline cellulose, examples of which are provided in U.S. Pat. No. 6,416,752, the contents of which are incorporated herein by reference in their entirety, and modified polymeric cellulose based materials such as, for example, METHOCEL® or ETHOCEL®, which are available commercially from The Dow Chemical Company, Midland, Mich.

In another embodiment, the pest bait provided comprises a composite member in a form that is moisture and degradation resistant and exhibits long-term durability and integrity. Similarly, in this form, it is contemplated that the composite member will generally be resistant to breaking apart following its placement in soil or other media. In a further embodiment, the composite member is formed by an extruded mixture of the bait material and pesticide. In another embodiment, the extruded mixture also includes a thermoplastic polymer material which, while not being limited to any particular configuration, can increase the moisture and degradation resistance of the pesticidal bait.

In another embodiment, one or more composite members that have a bait material and a pesticide and are configured to break apart or disintegrate over time and/or upon exposure to moisture may be used alone or in combination with the moisture and degradation resistant composite members described above. This type of composite member can be formed by a compressed mixture of the bait material and pesticide. In another embodiment, the compressed form of the composite member is configured to provide sufficient strength and structural integrity for a desired end use of the pesticidal bait. The pesticide retains its bioactivity as it resides within the compressed form, and produces a desired result after the pesticidal bait is ingested by or otherwise comes into contact with pests. The bait material may be defined by a material or mixture of materials that readily biodegrade and/or dissolve into the soil or other medium where each respective composite member is positioned. Following disintegration of the compressed bait and/or biodegradation/dissolution of the bait material, the pesticide retains its bioactivity and creates an effective barrier in the soil or other medium surrounding the original composite member in order to provide long-term control of the one or more species of pest even after the original composite member is no longer present.

In one form, the composite member described herein can be formed by extruding a mixture of the bait material and the pesticide into a desired shape, such as the shape of disk 50. In one particular form, the composite member can be formed by mixing a thermoplastic polymer, wood fragments or other cellulosic materials, and a pesticide, creating a molten or flowable material from the resulting mixture, and extruding or molding the molten material into a desired final shape. Further examples and details of suitable extruded composite members are found in International Patent Application Publication No. WO 2008/079384. Another example of a suitable extruded composite member is Recruit® HD, which is commercially available from Dow AgroSciences, LLC, 9330 Zionsville Road, Indianapolis, Ind. 46268.

In another form, the composite member described herein can be formed by grinding a mixture of the bait material and the pesticide in a grinder and then processing the ground material in a press (such as a Carver press) to provide a compressed form of the composite member. It should be appreciated that the press can be configured to provide the compressed form of the pesticidal baits with a desirable configuration such as disk 50, among other possibilities. In one form, the composite member is compressed at a pressure between about 5,000 and about 40,000 psi. In another form, the composite member is compressed at a pressure between about 10,000 and about 35,000 psi. Still, in another form the composite member is compressed at a pressure between about 12,000 and about 26,000 psi. However, it should be appreciated that additional variations in the pressure at which the composite member is compressed are contemplated. Moreover, a wide variety of material specifications and process parameters can affect the pressure at which the composite member is compressed. Still, other approaches contemplated for forming the composite member include extrusion (with or without post-extrusion processing), original mold design (with or without post-molding processing), and injection molding, just to provide a few non-limiting possibilities.

In one approach, the bait material, such as purified alpha cellulose for example, is pre-loaded with the pesticide before being ground in the grinder. In one manner of pre-loading, the pesticide is sprayed directly on cellulose particles, and the mixture of cellulose particles and pesticide is then compacted and broken into prills, which include the cellulose food material and the pesticide therein. When this approach is used, the pesticide is referred to as "incorporated in cellulose," and this method is referred to as an "incorporated in cellulose" method. In another manner of pre-loading the bait material with the pesticide, pre-formed prills of cellulose (which are available commercially, and can be obtained from International Fibers Corporation, North Tonawanda, N.Y.) are sprayed with the pesticide to provide a pre-loaded cellulose material. When this approach is used, the pesticide is referred to as "sprayed on cellulose," and this method is referred to as a "sprayed on cellulose" method. Still, in another approach, one or more Shatter™ termite baits (commercially available from Dow AgroSciences, LLC, 9330 Zionsville Road, Indianapolis, Ind. 46268) can be ground in the grinder and then processed with the press. The Shatter™ termite baits include a bait material in the form of cellulose and a pesticide in the form of hexaflumuron.

The pesticides used in the compositions and methods provided include those killing pests via ingestion or contact/exposure with the pesticides. In one embodiment, the pesticide retains its bioactivity within the pest bait for a period of time following the biodegradation/dissolution of the composite member, and produces a desired result after it is ingested by or otherwise comes into contact with pests. Some of the pesticides that can be employed in the composite members disclosed herein include, but are not limited to the following.

1,2-dichloropropane, abamectin, acephate, acetamiprid, acethion, acetoprole, acrinathrin, acrylonitrile, alanycarb, aldicarb, aldoxycarb, aldrin, allethrin, allosamidin, allyxycarb, alpha-cypermethrin, alpha-ecdysone, alpha-endosulfan, amidithion, aminocarb, amiton, amiton oxalate, amitraz, anabasine, athidathion, azadirachtin, azamethiphos, azinphos-ethyl, azinphos-methyl, azothoate, barium hexafluorosilicate, barthrin, bendiocarb, benfuracarb, bensultap, beta-cyfluthrin, beta-cypermethrin, bifenthrin, bioallethrin, bioethanomethrin, biopermethrin, bistrifluron, borax, boric acid, bromfenvinfos, bromocyclen, bromo-DDT, bromophos, bromophos-ethyl, bufencarb, buprofezin, butacarb, butathiofos, butocarboxim, butonate, butoxycarboxim, cadusafos, calcium arsenate, calcium polysulfide, camphechlor, carbanolate, carbaryl, carbofuran, carbon disulfide, carbon tetrachloride, carbophenothion, carbosulfan, cartap, cartap hydrochloride, chlorantraniliprole, chlorbicyclen, chlordane, chlordecone, chlordimeform, chlordimeform hydrochloride, chlorethoxyfos, chlorfenapyr, chlorfenvinphos, chlorfluazuron, chlormephos, chloroform, chloropicrin, chlorphoxim, chlorprazophos, chlorpyrifos, chlorpyrifos-methyl, chlorthiophos, chromafenozide, cinerin I, cinerin II, cinerins, cismethrin, cloethocarb, closantel, clothianidin, copper acetoarsenite, copper arsenate, copper naphthenate, copper oleate, coumaphos, coumithoate, crotamiton, crotoxyphos, crufomate, cryolite, cyanofenphos, cyanophos, cyanthoate, cyantraniliprole, cyclethrin, cycloprothrin, cyfluthrin, cyhalothrin, cypermethrin, cyphenothrin, cyromazine, cythioate, DDT, decarbofuran, deltamethrin, demephion, demephion-O, demephion-S, demeton, demeton-methyl, demeton-O, demeton-O-methyl, demeton-S, demeton-S-methyl, demeton-S-methylsulphon, diafenthiuron, dialifos, diatomaceous earth, diazinon, dicapthon, dichlofenthion, dichlorvos, dicresyl, dicrotophos, dicyclanil, dieldrin, diflubenzuron, dilor, dimefluthrin, dimefox, dimetan, dimethoate, dimethrin, dimethylvinphos, dimetilan, dinex, dinex-diclexine, dinoprop, dinosam, dinotefuran, diofenolan, dioxabenzofos, dioxacarb, dioxathion, disulfoton, dithicrofos, d-limonene, DNOC, DNOC-ammonium, DNOC-potassium, DNOC-sodium, doramectin, ecdysterone, emamectin, emamectin benzoate, EMPC, empenthrin, endosulfan, endothion, endrin, EPN, epofenonane, eprinomectin, esdepallethrine, esfenvalerate, etaphos, ethiofencarb, ethion, ethiprole, ethoate-methyl, ethoprophos, ethyl formate, ethyl-DDD, ethylene dibromide, ethylene dichloride, ethylene oxide, etofenprox, etrimfos, EXD, famphur, fenamiphos, fenazaflor, fenchlorphos, fenethacarb, fenfluthrin, fenitrothion, fenobucarb, fenoxacrim, fenoxycarb, fenpirithrin, fenpropathrin, fensulfothion, fenthion, fenthion-ethyl, fenvalerate, fipronil, flometoquin, flonicamid, flubendiamide (additionally resolved isomers thereof), flucofuron, flucycloxuron, flucythrinate, flufenerim, flufenoxuron, flufenprox, flufliprole, flupyradifurone, fluvalinate, fonofos, formetanate, formetanate hydrochloride, formothion, formparanate, formparanate hydrochloride, fosmethilan, fospirate, fosthietan, fufenozide, furathiocarb, furethrin, gamma-cyhalothrin, gamma-HCH, halfenprox, halofenozide, HCH, HEOD, heptachlor, heptenophos, heterophos, hexaflumuron, HHDN, hydramethylnon, hydrogen cyanide, hydroprene, hyquincarb, imidacloprid, imiprothrin, indoxacarb, iodomethane, IPSP, isazofos, isobenzan, isocarbophos, isodrin, isofenphos, isofenphos-methyl, isoprocarb, isoprothiolane, isothioate, isoxathion, ivermectin, jasmolin I, jasmolin II, jodfenphos, juvenile hormone I, juvenile hormone II, juvenile hormone III, kelevan, kinoprene, lambda-cyhalothrin, lead arsenate, lepimectin, leptophos, lindane, lirimfos, lufenuron, lythidathion, malathion, malonoben, mazidox, mecarbam, mecarphon, menazon, meperfluthrin, mephosfolan, mercurous chloride, mesulfenfos, metaflumizone, methacrifos, methamidophos, methidathion, methiocarb, methocrotophos, methomyl, methoprene, methothrin, methoxychlor, methoxyfenozide, methyl bromide, methyl isothiocyanate, methylchloroform, methylene chloride, metofluthrin, metolcarb, metoxadiazone, mevinphos, mexacarbate, milbemectin, milbemycin oxime, mipafox, mirex, molosultap, monocrotophos, monomehypo, monosultap, morphothion, moxidectin, naftalofos, naled, naphthalene, nicotine, nifluridide, nitenpyram, nithiazine, nitrilacarb, novaluron, noviflumuron, omethoate, oxamyl, oxydemeton-methyl, oxydeprofos, oxydisulfoton, para-dichlorobenzene, parathion, parathion-methyl, penfluron, pentachlorophenol, permethrin, phenkapton, phenothrin, phenthoate, phorate, phosalone, phosfolan, phosmet, phosnichlor, phosphamidon, phosphine, phoxim, phoxim-methyl, pirimetaphos, pirimicarb, pirimiphos-ethyl, pirimiphos-methyl, potassium arsenite, potassium thiocyanate, pp'-DDT, prallethrin, precocene I, precocene II, precocene III, primidophos, profenofos, profluralin, profluthrin, promacyl, promecarb, propaphos, propetamphos, propoxur, prothidathion, prothiofos, prothoate, protrifenbute, pymetrozine, pyraclofos, pyrafluprole, pyrazophos, pyresmethrin, pyrethrin I, pyrethrin II, pyrethrins, pyridaben, pyridalyl, pyridaphenthion, pyrifluquinazon, pyrimidifen, pyrimitate, pyriprole, pyriproxyfen, quassia, quinalphos, quinalphos-methyl, quinothion, rafoxanide, resmethrin, rotenone, ryania, sabadilla, schradan, selamectin, silafluofen, silica gel, sodium arsenite, sodium fluoride, sodium hexafluorosilicate, sodium thiocyanate, sophamide, spinetoram, spinosad, spiromesifen, spirotetramat, sulcofuron, sulcofuron-sodium, sulfluramid, sulfotep, sulfoxaflor, sulfuryl fluoride, sulprofos, tau-fluvalinate, tazimcarb, TDE, tebufenozide, tebufenpyrad, tebupirimfos, teflubenzuron, tefluthrin, temephos, TEPP, terallethrin, terbufos, tetrachloroethane, tetrachlorvinphos, tetramethrin, tetramethylfluthrin, theta-cypermethrin, thiacloprid, thiamethoxam, thicrofos, thiocarboxime, thiocyclam, thiocyclam oxalate, thiodicarb, thiofanox, thiometon, thiosultap, thiosultap-disodium, thiosultap-monosodium, thuringiensin, tolfenpyrad, tralomethrin, transfluthrin, transpermethrin, triarathene, triazamate, triazophos, trichlorfon, trichlormetaphos-3, trichloronat, trifenofos, triflumuron, trimethacarb, triprene, vamidothion, vaniliprole, XMC, xylylcarb, zeta-cypermethrin, and zolaprofos.

Additionally, any combination of the above pesticides can be used.

For more information consult "Compendium of Pesticide Common Names" located at http://www.alanwood.net/pesticides/index.html as of the filing date of this document. Also consult "The Pesticide Manual" 15th Edition, edited by C D S Tomlin, copyright 2009 by British Crop Production Council.

In one embodiment, the pesticide is one that has an immediate effect upon ingestion by or contact with a pest (referred to herein as an "immediate action" pesticide or a "fast acting" pesticide). For example, insecticides that have immediate killing action upon ingestion by termites include chlorpyrifos, spinosad, imidacloprid and fipronil, each of which is well known and available commercially. As used herein, the term "immediate" is intended to mean that the pesticide typically operates to kill an individual pest before the pest returns to its colony. In another embodiment, the pesticide is one that exhibits a delayed effect upon ingestion by or contact with a pest (referred to herein as a "delayed action" pesticide). Non-limiting examples of insecticides that have delayed killing activity upon ingestion by or contact with termites include hexaflumuron and noviflumuron, each of which is well known and available commercially. As used herein, the term "delayed" is intended to mean that the pesticide typically does not operate to kill an individual pest until after the pest has returned to its colony. In another embodiment, the pesticide is selected from the group consisting of hexaflumuron, lufenuron, flufenoxuron, diflubenzuron, bistrifluron, sulfuramid, hydramethylnon, novaluron and noviflumuron.

The attractant used in the compositions and methods provided include Compound A representing cyclopropene compounds having the following formula ("Formula One"):

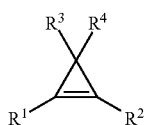

Formula One where each $R^1$, $R^2$, $R^3$ and $R^4$ is independently selected from the group consisting of H and a chemical group of the formula:

-(L)$_n$-Z where n is an integer from 0 to 12. Each L is a bivalent radical. Suitable L groups include, for example, radicals containing one or more atoms selected from B, C, N, O, P, S, Si, or mixtures thereof. The atoms within an L group may be connected to each other by single bonds, double bonds, triple bonds, or mixtures thereof. Each L group may be linear, branched, cyclic, or a combination thereof. In any one R group (i.e., any one of $R^1$, $R^2$, $R^3$ and $R^4$) the total number of heteroatoms (i.e., atoms that are neither H nor C) is from 0 to 6. Independently, in any one R group the total number of non-hydrogen atoms is 50 or less. Each Z is a monovalent radical. Each Z is independently selected from the group consisting of a $C_1$-$C_8$ alkyl, hydrogen, halo, cyano, nitro, nitroso, azido, chlorate, bromate, iodate, isocyanato, isocyanido, isothiocyanato, pentafluorothio, and a chemical group G, wherein G is a 3- to 14-membered ring system.

The $R^1$, $R^2$, $R^3$, and $R^4$ groups are independently selected from the suitable groups. Among the groups that are suitable for use as one or more of $R^1$, $R^2$, $R^3$, and $R^4$ are, for example, aliphatic groups, aliphatic-oxy groups, alkylphosphonato groups, cycloaliphatic groups, cycloalkylsulfonyl groups, cycloalkylamino groups, heterocyclic groups, aryl groups, heteroaryl groups, halogens, silyl groups, and mixtures and combinations thereof. Groups that are suitable for use as one or more of $R^1$, $R^2$, $R^3$, and $R^4$ may be substituted or unsubstituted.

Among the suitable $R^1$, $R^2$, $R^3$, and $R^4$ groups are, for example, aliphatic groups. Some suitable aliphatic groups include, for example, alkyl, alkenyl, and alkynyl groups. Suitable aliphatic groups may be linear, branched, cyclic, or a combination thereof. Independently, suitable aliphatic groups may be substituted or unsubstituted.

As used herein, a chemical group of interest is said to be "substituted" if one or more hydrogen atoms of the chemical group of interest is replaced by a substituent.

Also among the suitable $R^1$, $R^2$, $R^3$, and $R^4$ groups are, for example, substituted and unsubstituted heterocyclyl groups that are connected to the cyclopropene compound through an intervening oxy group, amino group, carbonyl group, or sulfonyl group; examples of such $R^1$, $R^2$, $R^3$, and $R^4$ groups are heterocyclyloxy, heterocyclylcarbonyl, diheterocyclylamino, and diheterocyclylaminosulfonyl.

Also among the suitable $R^1$, $R^2$, $R^3$, and $R^4$ groups are, for example, substituted and unsubstituted heterocyclic groups that are connected to the cyclopropene compound through an intervening oxy group, amino group, carbonyl group, sulfonyl group, thioalkyl group, or aminosulfonyl group; examples of such $R^1$, $R^2$, $R^3$, and $R^4$ groups are diheteroarylamino, heteroarylthioalkyl, and diheteroarylaminosulfonyl.

Also among the suitable $R^2$, $R^3$, and $R^4$ groups are, for example, hydrogen, fluoro, chloro, bromo, iodo, cyano, nitro, nitroso, azido, chlorate, bromate, iodate, isocyanato, isocyanido, isothiocyanato, pentafluorothio, acetoxy, carboethoxy, cyanato, nitrato, nitrito, perchlorato, allenyl, butylmercapto, diethylphosphonato, dimethylphenylsilyl, isoquinolyl, mercapto, naphthyl, phenoxy, phenyl, piperidino, pyridyl, quinolyl, triethylsilyl, trimethylsilyl, and substituted analogs thereof.

As used herein, the chemical group G is a 3- to 14-membered ring system. Ring systems suitable as chemical group G may be substituted or unsubstituted; they may be aromatic (including, for example, phenyl and napthyl) or aliphatic (including unsaturated aliphatic, partially saturated aliphatic, or saturated aliphatic); and they may be carbocyclic or heterocyclic. Among heterocyclic G groups, some suitable heteroatoms are, for example, nitrogen, sulfur, oxygen, and combinations thereof. Ring systems suitable as chemical group G may be monocyclic, bicyclic, tricyclic, polycyclic, spiro, or fused; among suitable chemical group G ring systems that are bicyclic, tricyclic, or fused, the various rings in a single chemical group G may be all the same type or may be of two or more types (for example, an aromatic ring may be fused with an aliphatic ring).

In one embodiment, one or more of $R^2$, $R^3$, and $R^4$ is hydrogen or $C_1$-$C_{10}$ alkyl. In another embodiment, each of $R^1$, $R^2$, $R^3$, and $R^4$ is hydrogen or $C_1$-$C_8$ alkyl. In another embodiment, each of $R^1$, $R^2$, $R^3$, and $R^4$ is hydrogen or $C_1$-$C_4$ alkyl. In another embodiment, each of $R^1$, $R^2$, $R^3$, and $R^4$ is hydrogen or methyl. In another embodiment, $R^1$ is $C_1$-$C_4$ alkyl and each of $R^2$, $R^3$, and $R^4$ is hydrogen. In another embodiment, $R^1$ is methyl and each of $R^2$, $R^3$, and $R^4$ is hydrogen, and the cyclopropene compound is known herein as 1-methylcyclopropene or "1-MCP."

In one embodiment, the Compound B (cyclopropene compound) is of the formula:

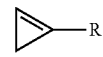

wherein R is a substituted or unsubstituted alkyl, alkenyl, alkynyl, cycloalkyl, cycloalkylalkyl, phenyl, or naphthyl group; wherein the substituents are independently halogen, alkoxy, or substituted or unsubstituted phenoxy. In one embodiment, R is $C_1$-$C_8$ alkyl. In another embodiment, R is methyl.

In another embodiment, the Compound B (cyclopropene compound) is of the formula:

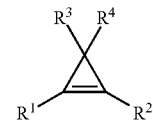

wherein $R^1$ is a substituted or unsubstituted $C_1$-$C_4$ alkyl, $C_2$-$C_4$ alkenyl, $C_2$-$C_4$ alkynyl, $C_3$-$C_6$ cycloalkyl, cycloalkylalkyl, phenyl, or napthyl group; and $R^2$, $R^3$, and $R^4$ are hydrogen. In another embodiment, the cyclopropene comprises 1-methylcyclopropene (1-MCP).

In some embodiments, a cyclopropene is used that has boiling point at one atmosphere pressure of 50° C. or lower; or 25° C. or lower; or 15° C. or lower. Independently, in some embodiments, a cyclopropene is used that has boiling point at one atmosphere pressure of −100° C. or higher; −50° C. or higher; or −25° C. or higher; or 0° C. or higher.

The cyclopropenes applicable to this invention may be prepared by any method. Some suitable methods of preparation of cyclopropenes are the processes disclosed in U.S.

Pat. Nos. 5,518,988 and 6,017,849. Any compound that is not a cyclopropene is known herein as a "non-cyclopropene."

When a cyclopropene compound is used, in some embodiments the concentration of the cyclopropene compound as used in the compositions and/or methods provided is 0.5 ppb or higher; 1 ppb or higher; 10 ppb or higher; or 100 ppb or higher. In some embodiments, the concentration of the cyclopropene compound is 100 ppm or lower; 50 ppm or lower; 10 ppm or lower; or 5 ppm or lower. In some embodiments, the concentration of the cyclopropene compound is between 5 ppm and 250 ppm; between 25 ppm and 100 ppm; between 45 ppm and 150 ppm; or between 15 ppm and 100 ppm.

In some embodiments, one or more composition of the present invention includes at least one ionic complexing reagent. An ionic complexing reagent interacts with a cyclopropene to form a complex that is stable in water. Some suitable ionic complexing reagents, for example, include lithium ion. In some embodiments, no ionic complexing reagent is used.

In some embodiments, no composition of the present invention includes any molecular encapsulating agent. In other embodiments, one or more composition of the present invention includes at least one molecular encapsulating agent. In another embodiment, the molecular encapsulating agent is selected from the group consisting of substituted cyclodextrins, unsubstituted cyclodextrins, and combinations thereof. In a further embodiment, the molecular encapsulating agent comprises alpha-cyclodextrin.

When a molecular encapsulating agent is used, suitable molecular encapsulating agents include, for example, organic and inorganic molecular encapsulating agents. Suitable organic molecular encapsulating agents include, for example, substituted cyclodextrins, unsubstituted cyclodextrins, and crown ethers. Suitable inorganic molecular encapsulating agents include, for example, zeolites. Mixtures of suitable molecular encapsulating agents are also suitable. In some embodiments of the invention, the encapsulating agent is alpha-cyclodextrin, beta-cyclodextrin, gamma-cyclodextrin, or a mixture thereof. In some embodiments of the invention, particularly when the cyclopropene is 1-methylcyclopropene, the encapsulating agent is alpha-cyclodextrin. The preferred encapsulating agent will vary depending upon the structure of the cyclopropene or cyclopropenes being used. Any cyclodextrin or mixture of cyclodextrins, cyclodextrin polymers, modified cyclodextrins, or mixtures thereof can also be utilized pursuant to the present invention. Some cyclodextrins are available, for example, from Wacker Biochem Inc., Adrian, Mich. or Cerestar USA, Hammond, Ind., as well as other vendors.

In some of the embodiments in which a molecular encapsulating agent is present, at least one molecular encapsulating agent encapsulates one or more cyclopropenes. A cyclopropene or substituted cyclopropene molecule encapsulated in a molecule of a molecular encapsulating agent is known herein as a "cyclopropene molecular encapsulating agent complex." The cyclopropene molecular encapsulation agent complexes can be prepared by any means. In one method of preparation, for example, such complexes are prepared by contacting the cyclopropene with a solution or slurry of the molecular encapsulation agent and then isolating the complex, using, for example, processes disclosed in U.S. Pat. No. 6,017,849. For example, in one method of making a complex in which 1-MCP is encapsulated in a molecular encapsulating agent, the 1-MCP gas is bubbled through a solution of alpha-cyclodextrin in water, from which the complex first precipitates and is then isolated by filtration. In some embodiments, complexes are made by the above method and, after isolation, are dried and stored in solid form, for example as a powder, for later addition to useful compositions.

In some embodiments, one or more molecular encapsulating agent and one or more cyclopropenes are both present in a composition; in some of such embodiments, the amount of molecular encapsulating agent can usefully be characterized by the ratio of moles of molecular encapsulating agent to moles of cyclopropene. In some embodiments, the ratio of moles of molecular encapsulating agent to moles of cyclopropene is 0.1 or larger; or 0.2 or larger; or 0.5 or larger; or 0.9 or larger. Independently, in some of such embodiments, the ratio of moles of molecular encapsulating agent to moles of cyclopropene is 2 or lower; or 1.5 or lower.

Those skilled in the art would understand certain variations can exist based on the disclosure provided. Thus, the following examples are given for the purpose of illustrating the invention and shall not be construed as being a limitation on the scope of the invention or claims.

EXAMPLES

Example 1

HAIP powders (High Active Ingredient Particles; a powder of 1-methylcyclopropene (1-MCP) complexed with alpha-cyclodextrin) are obtained from AgroFresh Inc. and mixed with sodium bentonite/clay material to form a granule formulation.

Figure 1B:
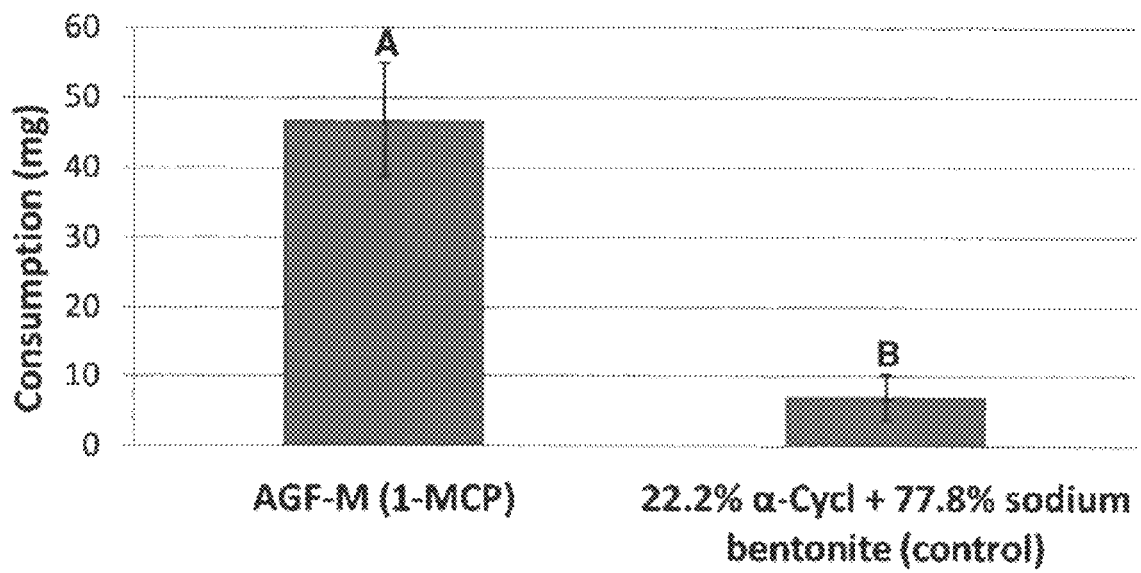
FIG. 1B shows results of another representative experiment for 1-MCP as an attractant to termite.

Two-way choice bioassays are conducted with the granule formulation containing 1% 1-MCP in weight boats. Test materials are placed in weigh boats to prevent physical contact of termite workers with test material. Filter papers associated with 1-MCP are used to qualify consumption. Bioassay arenas are placed inside sealed plastic containers with open moisture sources to maintain high humidity for releasing 1-MCP from the granule formulation. Significant higher consumption of associated filter paper is measured in a series of experiments and validated tests (see FIG. 1A and FIG. 1B). The experiment results are also shown in Table 1, where negative control uses granules having 22% alpha-cyclodextrin+78% sodium bentonite.

TABLE 1

Representative experiments showing 1-MCP as an attractant to termites

| Test number | Treatment | Filter paper consumed (mg) ± SEM | P value | Preference Ratio (Highest/Lowest) |
|---|---|---|---|---|
| 1 | 0.25 g 1% 1-MCP granules | 61.12 ± 4.87 | <0.0001 | 6.19 |
|  | Negative control | 9.87 ± 4.23 |  |  |
| 2 | 0.5 g 1% 1-MCP granules | 47.47 ± 5.50 | 0.0006 | 3.44 |
|  | Negative control | 13.79 ± 5.32 |  |  |
| 3 | 0.75 g 1% 1-MCP granules | 50.12 ± 5.66 | <0.0001 | 8.34 |
|  | Negative control | 6.01 ± 3.85 |  |  |
| 4 | 1.0 g 1% 1-MCP granules | 40.40 ± 5.33 | 0.0014 | 2.99 |
|  | Negative control | 13.52 ± 4.18 |  |  |

We claim:

1. An insect bait comprising:
   an effective amount of at least one cyclopropene compound as an insect attractant, wherein the cyclopropene compound is encapsulated with a molecular encapsulating agent; and
   an insect food,
   wherein the incest bait is comprised in a termite station.

2. The insect bait of claim 1, wherein the cyclopropene compound is of the formula:

wherein R is a substituted or unsubstituted alkyl, alkenyl, alkynyl, cycloalkyl, cycloalkylalkyl, phenyl, or naphthyl group, and wherein the substituents are independently halogen, alkoxy, or substituted or unsubstituted phenoxy.

3. The insect bait of claim 2, wherein R is $C_1$-$C_8$ alkyl.

4. The insect bait of claim 2, wherein R is methyl.

5. The insect bait of claim 1, wherein the cyclopropene compound is of the formula:

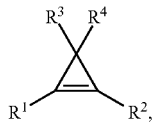

wherein $R^1$ is a substituted or unsubstituted $C_1$-$C_4$ alkyl, $C_1$-$C_4$ alkenyl, $C_1$-$C_4$ alkynyl, $C_3$-$C_6$ cycloalkyl, cylcoalkylalkyl, phenyl, or napthyl group, and wherein $R^2$, $R^3$, and $R^4$ are hydrogen.

6. The insect bait of claim 1, wherein the cyclopropene compound is 1-methylcyclopropene (1-MCP).

7. The insect bait of claim 1, wherein the molecular encapsulating agent is selected from alpha-cyclodextrin, beta-cyclodextrin, gamma-cyclodextrin, or combinations thereof.

8. The insect bait of claim 1, further comprising at least one insecticide.

9. The insect bait of claim 8, wherein the insecticide is selected from the group consisting of abamectin, acephate, acetamiprid, acetoprole, aldicarb, amidoflumet, amitraz, avermectin, azadirachtin azinphos-methyl, bifenthrin, bifenazate, bistrifluoron, buprofezin, carbofuran, cartap, chinomethionat, chlorfenapyr, chlorfluazuron, chlorantraniliprole, chlorpyrifos, chlorpyrifos-methyl, chlorobenzilate, chromafenozide, clothianidin, cyflumetofen, cyfluthrin, beta-cyfluthrin, cyhalothrin, gamma-cyhalothrin, lambda-cyhalothrin, cyhexatin, cypermethrin, cyromazine, deltamethrin, diafenthiuron, diazinon, dicofol, dieldrin, dienochlor, diflubenzuron, dimefluthrin, dimethoate, dinotefuran, diofenolan, emamectin, endosulfan, esfenvalerate, ethiprole, etoxazole, fenamiphos, fenazaquin, fenbutatin oxide, fenothiocarb, fenoxycarb; fenpropathrin, fenpyroximate, fenvalerate, fipronil, flonicamid, flubendiamide, flucythrinate, tau-fluvalinate, flufenerim, flufenoxuron, fonophos, halofenozide, hexaflumuron, hexythiazox, hydramethylnon, imicyafos, imidacloprid, indoxacarb, isofenphos, lufenuron, malathion, metaflumizone, metaldehyde, methamidophos, methidathion, methomyl, methoprene, methoxychlor, methoxyfenozide, metofluthrin, monocrotophos, nitenpyram, nithiazine, novaluron, noviflumuron, oxamyl, parathion, parathion-methyl, permethrin, phorate, phosalone, phosmet, phosphamidon, pirimicarb, profenofos, profluthrin, propargite, protrifeBbute, pymetrozine, pyrafluprole, pyrethrin, pyridaben, pyridalyl, pyrifluquinazon, pyriprole, pyriproxyfen, rotenone, ryanodine, spinetoram, spinosad, spiridiclofen, spiromesifen, spirotetramat, sulprofos, tebufenozide, tebufenpyrad, teflubenzuron, tefluthrin, terbufos, tetrachlorvinphos, thiacloprid, thiamethoxam, thiodicarb, thiosultap-sodium, tolfenpyrad, tralomethrin, triazamate, trichlorfon, triflumuron, and encapsulated delta-endotoxins of *Bacillus thringiensis*.

10. The insect bait of claim 1, wherein the insect food is purified cellulose.

11. The insect bait of claim 10, wherein the bait is compacted and dried.

* * * * *